(12) United States Patent  
Lu (10) Patent No.: US 7,221,870 B2
(45) Date of Patent: May 22, 2007

(54) RING MAP DISCOVERY AND VALIDATION METHOD AND SYSTEM FOR OPTICAL NETWORK APPLICATIONS

(75) Inventor: Kun Lu, Richardson, TX (US)

(73) Assignee: FutureWei Technologies, Inc., Plano, TX (US)

( * ) Notice: Subject to any disclaimer, the term of this patent is extended or adjusted under 35 U.S.C. 154(b) by 745 days.

(21) Appl. No.: 10/691,474

(22) Filed: Oct. 21, 2003

(65) Prior Publication Data

US 2007/0071442 A1 Mar. 29, 2007

(51) Int. Cl.
*H04B 10/20* (2006.01)
*H04J 14/00* (2006.01)
*H04L 12/28* (2006.01)

(52) U.S. Cl. .............................. 398/59; 398/58; 398/66; 370/258

(58) Field of Classification Search ................. 398/59, 398/49, 57, 58, 66; 370/258, 254, 257, 404, 370/405, 403, 400
See application file for complete search history.

(56) References Cited

U.S. PATENT DOCUMENTS 6,657,969 B1 * 12/2003 Neuendorff et al. ........ 370/245
6,850,708 B2 * 2/2005 Condict et al. ............. 398/57
2002/0075540 A1 6/2002 Munter
2002/0114031 A1 * 8/2002 Yamada ...................... 359/119
2002/0186667 A1 * 12/2002 Mor et al. ................... 370/258
2003/0058804 A1 * 3/2003 Saleh et al. ................. 370/254
2004/0120270 A1 * 6/2004 Saxon et al. ................ 370/258
2005/0254429 A1 * 11/2005 Kato et al. .................. 370/238

FOREIGN PATENT DOCUMENTS

WO WO 03/041304 5/2003

* cited by examiner

*Primary Examiner*—M. R. Sedighian
(74) *Attorney, Agent, or Firm*—Townsend and Townsend and Crew LLP (57) ABSTRACT

A method and system for generating a ring map for optical network applications. The method includes sending a first discovery message to a first node through a portion of an optical network. The first node corresponds to a first node identification and a first predetermined identification. The first discovery message includes at least a source node identification associated with a source node, a source predetermined identification associated with the source node, and a first ring connectivity map. Additionally, the method includes if the source node identification and the first node identification are different, updating the first ring connectivity map. Also, the method includes if the source node identification and the first node identification are identical and if the source predetermined identification and the first predetermined identification are different sending a first alarm message.

29 Claims, 8 Drawing Sheets

RING MAP DISCOVERY AND VALIDATION METHOD AND SYSTEM FOR OPTICAL NETWORK APPLICATIONS

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates in general to telecommunication techniques. More particularly, the invention provides a method and system including a ring map discovery and validation technique for optical networks. Merely by way of example, the invention is described as it applies to Bi-directional Line-Switched Ring (BLSR) in Synchronous Optical Network (SONET), but it should be recognized that the invention has a broader range of applicability.

Telecommunication techniques have progressed through the years. As merely an example, Synchronous Optical Network (SONET) has been used for conventional optical telecommunications for telephone applications. SONET defines a technique for transmitting multiple signals of different capacities through a synchronous, flexible, optical hierarchy. The SONET can terminate signals, multiplex signals from a lower speed to a higher speed, switch signals, and transport signals in the network according to certain definitions. Multiple SONET nodes may be interconnected into a ring structure to achieve high survivability. For example, if the SONET suffers from a connection failure at one location, the SONET can intelligently send the affected signals through one or more alternative routes without encountering the failure location. Such rerouting process is often known as automatic protection switching (APS). A Bi-directional Line-Switched Ring (BLSR) is a ring, which uses the SONET line-level status and performance parameters to initiate the APS process.

In a BLSR, a terminal is often called a node. The terminal is assigned to a node ID. The node ID identifies the SONET terminal within the BLSR. The value of a Node ID often ranges from 0 to 15 as described in Standard GR-1230-CORE. See GR-1230-CORE, SONET Bi-directional Line-Switched Ring Criteria, Issue 4, December 1998. The Node IDs on a BLSR may not have consecutive values; hence the value of a Node ID usually does not imply any connectivity information but is merely the identification for a node in the ring. To represent the physical connectivity, a ring map contains a complete order of Node IDs. The ring map is usually available at each node along with a squelch table. The squelch table can provide the source and destination nodes for each traffic signal, and is used along with ring map to prevent traffic misconnection in case of node failure or ring segmentation.

Conventionally, the ring map at each node is usually provisioned manually without any validation mechanism. The validation mechanism can ensure all nodes in the ring have consistent ring maps. Additionally, when a node is removed from the ring or added to the ring, the ring map at each node is usually updated manually to reflect the new topology. Some protocols have been implemented to perform automatic ring map discovery. These protocols, however, usually involve complicated mechanisms without automatic validation of discovered ring map. Other limitations also exist with conventional BLSR techniques.

Hence it is highly desirable to improve ring map discovery and validation techniques for optical networks.

BRIEF SUMMARY OF THE INVENTION

The present invention relates in general to telecommunication techniques. More particularly, the invention provides a method and system including a ring map discovery and validation technique for optical networks. Merely by way of example, the invention is described as it applies to Bi-directional Line-Switched Ring (BLSR) in Synchronous Optical Network (SONET), but it should be recognized that the invention has a broader range of applicability.

According to one embodiment of the present invention, a method for generating a ring map for optical network applications includes sending a first discovery message to a first node through a portion of an optical network. The first node corresponds to a first node identification and a first predetermined identification. The first discovery message includes at least a source node identification associated with a source node, a source predetermined identification associated with the source node, and a first ring connectivity map. Additionally, the method includes processing at least information associated with the source node identification and the first node identification. Moreover, the method includes if the source node identification and the first node identification are different, updating the first ring connectivity map. Also, the method includes if the source node identification and the first node identification are identical, processing at least information associated with the source predetermined identification and the first predetermined identification and if the source predetermined identification and the first predetermined identification are different sending a first alarm message indicating multiple assignments of the source node identification.

According to another embodiment of the present invention, a method for validating a ring map for optical network applications includes sending a first validation message from a source node through at least a portion of an optical network. The source node is associated with a first ring map. The first validation message includes at least a source node identification associated with the source node and a first ring connectivity map associated with the source node. The first ring map includes at least information associated with the source node identification and the first ring connectivity map. Additionally, the method includes receiving the first validation message at a first node directly from the source node. The first node is associated with a second ring map. Moreover, the method includes processing at least information associated with the source node identification and the second ring map. Also, the method includes if the source node identification is not associated with a predetermined node, sending a first initialization message. Additionally, the method includes if the source node identification is associated with the predetermined node, processing at least information associated with the first ring connectivity map and the second ring map, if the first ring map and the second ring map are inconsistent sending a first alarm message.

According to yet another embodiment of the present invention, a method for processing a discovery message for optical network applications includes sending a first discovery message to a first node through a portion of an optical network. The first node is associated with a first node identification and a first predetermined identification. The first discovery message includes at least a source node identification associated with a source node, a source predetermined identification associated with the source node, and a first ring connectivity map. Additionally, the method includes if the first node includes a second ring map, processing at least information associated with the second ring map and the source node identification and if the source node identification is absent from the second ring map sending a first initialization message. Moreover, the method includes if the first node is free from the second ring map, processing at least information associated with the source node identification and the first node identification, if the source node identification and the first node identification are different updating the first ring connectivity map and sending the first discovery message to a second node. Also, the method includes if the source node identification and the first node identification are identical, processing at least information associated with the source predetermined identification and the first predetermined identification and if the source predetermined identification and the first predetermined identification are different sending a first alarm message indicating multiple assignments of the source node identification.

According to yet another embodiment of the present invention, a method for processing a validation message for optical network applications includes sending a first validation message from a source node through at least a portion of an optical network. The source node is associated with a first ring map. The first validation message includes at least a source node identification associated with the source node and a first ring connectivity map associated with the source node. The first ring map includes at least information associated with the source node identification and the first ring connectivity map. Additionally, the method includes receiving the first validation message at a first node directly from the source node. Moreover, the method includes if the first node includes a second ring map, processing at least information associated with the source node identification and the second ring map, if the source node identification is not associated with a predetermined node sending a first initialization message, if the source node identification is associated with the predetermined node processing at least information associated with the first ring map and the second ring map and if the first ring map and the second ring map are inconsistent, sending a first alarm message.

According to yet another embodiment of the present invention, an apparatus for generating a ring map for optical network applications includes a message receiver configured to receive a first discovery message. The first discovery message includes at least a first node identification associated with a first node, a first predetermined identification associated with the first node, and a first ring connectivity map. Additionally, the apparatus includes a message sender configured to send an alarm message and send a second discovery message. The second discovery message includes at least a second node identification associated with a second node, a second predetermined identification associated with the second node, and a second ring connectivity map. Moreover, the apparatus includes a memory system configured to store at least information associated with a ring map. Also, the apparatus includes a processing system coupled to the message receiver, the message sender, and the memory system and associated with a third node identification and a third predetermined identification. The processing system is configured to process at least information associated with the first node identification and the third node identification, and if the first node identification and the third node identification are different update the first ring connectivity map. Additionally, the processing system is configured to if the first node identification and the third node identification are identical, processing at least information associated with the first predetermined identification and the third predetermined identification, and if the first predetermined identification and the third predetermined identification are different instruct the message sender to send the alarm message indicating multiple assignments of the first node identification.

According to yet another embodiment, an apparatus for validating a ring map for optical network applications includes a message receiver configured to receive a first validation message. The first validation message includes at least a first node identification associated with a first node and a first ring connectivity map associated with the first node. The first validation message is also associated with a first ring map including at least information associated with the first node identification and the first ring connectivity map. Additionally, the apparatus includes a message sender configured to send an initialization message, send an alarm message, and send a second validation message. The second validation message includes at least a second node identification associated with a second node and a second ring connectivity map associated with the second node. The second validation message is also associated with a second ring map including at least information associated with the second node identification and the second ring connectivity map. Moreover, the apparatus includes a memory system configured to store at least information associated with the second ring map. Also, the apparatus includes a processing system coupled to the message receiver, the message sender, and the memory system and associated with the second node identification and the second predetermined identification. The processing system is configured to process at least information associated with the first node identification and the second ring map, and if the first node identification is not associated with a predetermined node send the initialization message. Additionally, the processing system is configured to if the first node identification is associated with the predetermined node, process at least information associated with the first ring map and the second ring map and if the first ring map and the second ring map are inconsistent instruct the message sender to send the alarm message.

Many benefits are achieved by way of the present invention over conventional techniques. For example, certain embodiments of the present invention reduce the number of the types of messages used for ring map discovery and validation. These different types of messages use a uniform format to simply message processing and facilitate implementation. Some embodiments of the present invention enable SONET equipments to automatically discover ring connectivity in BLSR. The discovery process can effectively detect whether a single Node ID has been assigned to multiple nodes. Certain embodiments of the present invention provide reliable ring maps by validating the consistency of ring maps at various nodes. Some embodiments of the present invention support both the manual provision and the automatic discovery of ring map. Certain embodiments of the present invention provide a mechanism for nodes to automatically detect ring topology change and update their ring maps. The ring topology change may include removal of a node or addition of a node.

Various additional objects, features and advantages of the present invention can be more fully appreciated with reference to the detailed description and accompanying drawings that follow.

DETAILED DESCRIPTION OF THE INVENTION

The present invention relates in general to telecommunication techniques. More particularly, the invention provides a method and system including a ring map discovery and validation technique for optical networks. Merely by way of example, the invention is described as it applies to Bi-directional Line-Switched Ring (BLSR) in Synchronous Optical Network (SONET), but it should be recognized that the invention has a broader range of applicability.

Figure 1:
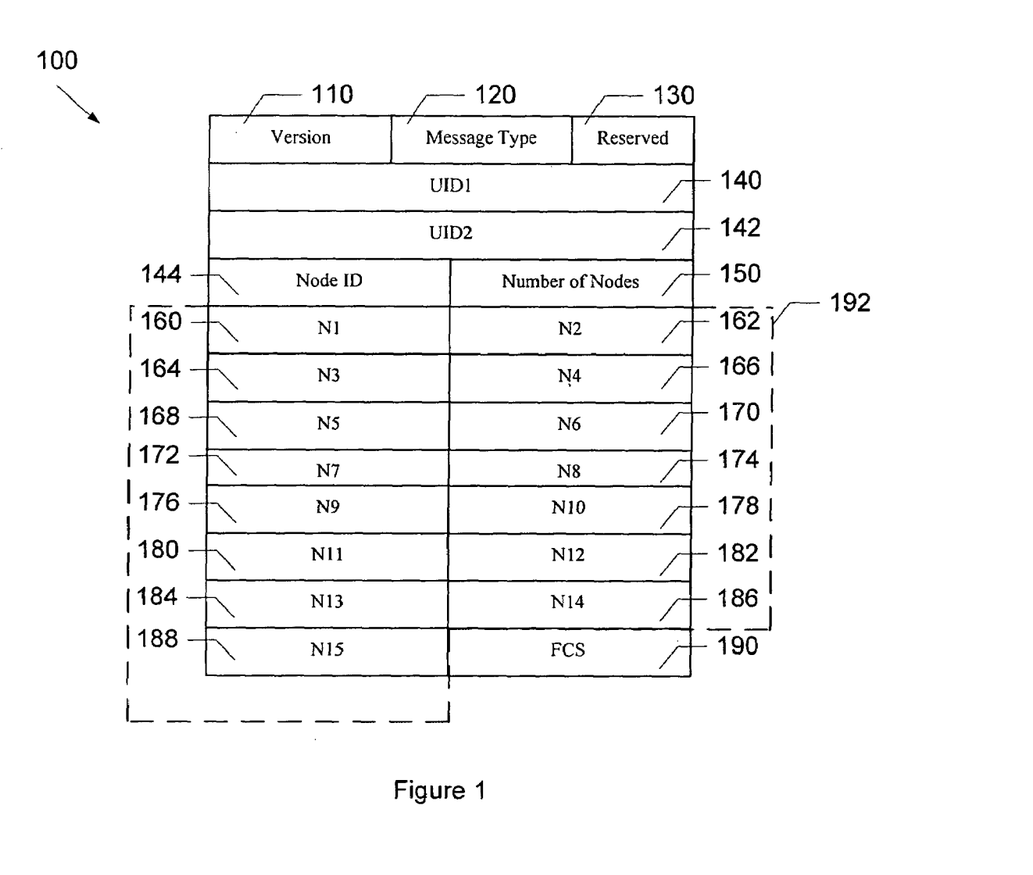
FIG. 1 is a simplified diagram for protocol message according to one embodiment of the present invention.

FIG. 1 is a simplified diagram for protocol message according to one embodiment of the present invention. The diagram is merely an example, which should not unduly limit the scope of the present invention. One of ordinary skill in the art would recognize many variations, alternatives, and modifications. In FIG. 1, a protocol message 100 includes a version field 110, a message type field 120, a reserved field 130, a source UID field 140, a source UID field 142, a source Node ID field 144, a field 150 for number of nodes, a FCS field 190, and a field 192 for ring connectivity map. Although the above has been shown using message fields 110, 120, 130, 140, 142, 144, 150, 190, and 192, there can be many alternatives, modifications, and variations. For example, the number of bits in each field may vary depending upon specific applications of the present invention. Some of the message fields may be combined. Other fields may be added to the protocol message. Depending upon the embodiment, one or more of the message fields may be removed. For example, one of the UID fields 140 and 142 may be removed. As another example, the FCS field 190 may be removed or not used. Further details of these processes are found throughout the present specification and more particularly below.

The field 110 stores information identifying a version of the protocol. For example, the identification is represented by a 3-bit datum. The version information facilitates a BLSR node to process the protocol message appropriately. For example, a BLSR node can handle both versions 1 and 2. If the BLSR node receives a message of version 3, the BLSR node can disregard the message. If the BLSR node receives a message of version 2, the BLSR node would use the version 2 processes, not the version 1 processes, to analyze the message. The version information can facilitate communications between multiple nodes with different abilities to handle various versions.

The source UID fields 140 and 142 together store information regarding a unique identification of the source node. The source node is the node from which the corresponding protocol message originates. The unique identification is different from one node to another node and independent from BLSR. For example, the source UID fields 140 and 142 each occupy 8 bits of the protocol message. Together, these two 8-bit fields carry a 16-bit unique identification of the node. The 16-bit unique identification may be the last 16 bits of an IP address.

The reserved field 130 is usually not in use and set to zero. For example, the field 130 occupies 2 bits of the protocol message. The source Node ID field 144 store information regarding a node ID of the source node. The node ID is usually assigned by the BLSR management. The field 150 for number of nodes stores information regarding the number of nodes in the protocol message. The FCS field 190 stores checksum of the message to ensure the integrity of the message. For example, the fields 144, 150 and 190 each occupy 4 bits of the protocol message.

The field 192 for ring connectivity map stores information regarding connections between various nodes within BLSR. As shown in FIG. 1, the field 192 includes multiple subfields. For example, the field 192 includes subfields 160, 162, 164, 166, 168, 170, 172, 174, 176, 178, 180, 182, 184, 186, and 188 for Node IDs $N_1$ through $N_{15}$ respectively. These subfields sequentially store Node IDs for nodes encountered by the protocol message as the message traverses from the source node through BLSR. Each subfield may occupy 4 bits of the protocol message. The ring map in the protocol message 100 refers to a list of Node IDs of $N_0$, $N_1$, $N_2$, ..., $N_n$, ..., and $N_k$. The Node ID $N_0$ is stored in the field 144. The Node IDs $N_1$, $N_2$, ..., $N_n$, ..., and $N_k$ are stored in the subfields 160, 162, ..., 160+2(n−1), ..., and 160+2(k−1). n is a positive integer, and k is the number of nodes stored in the field 150. Although the above has been shown using the subfields 160, 162, 164, 166, 168, 170, 172, 174, 176, 178, 180, 182, 184, 186, and 188, there can be many alternatives, modifications, and variations. For example, the number of bits in each subfield may equal to or different from 4. Some of the subfields may be combined. Other subfields for node IDs may be added to the message structure. The ring map in the protocol message 100 may refer to a list of Node IDs starting with a Node ID other than $N_0$. For example, the list includes $N_1$, $N_2$, ..., $N_n$, ..., $N_k$, and $N_0$, or includes $N_2$, ..., $N_n$, ..., $N_k$, $N_0$, and $N_1$ sequentially. Depending upon the embodiment, one or more of the subfields may be removed. Further details of these processes are found throughout the present specification and more particularly below.

The message type field 120 stores information regarding the type of the protocol message. For example, the message type field 120 occupies 3 bit of the protocol message. According to one embodiment, there are at least five types including RM_DISCOVER, RM_VALIDATE, RM_INIT, RM_SWITCH_A, and RM_SWITCH_M. RM_DISCOVER refers to a ring map discovery message which is used to discover node connectivity. RM_VALIDATE refers to a ring map validation message which is used to verify consistency of ring maps at various nodes. RM_INIT refers to a ring map initialization message which is used to initialize ring maps at various nodes. RM_SWITCH_A refers to a manual-to-automatic mode message which is used to switch a node from a manual mode to an automatic mode. RM_SWITCH_M refers to an automatic-to-manual mode message which is used to switch a node from an automatic mode to a manual mode. These five types of messages are represented by different 3-bit values as shown in Table 1.

TABLE 1

| Message Types | Values |
|---|---|
| RM_DISCOVER | 000 |
| RM_VALIDATE | 001 |
| RM_INIT | 010 |
| RM_SWITCH_A | 011 |
| RM_SWITCH_M | 100 |

As shown in FIG. 1, the protocol message includes the fields 110, 120, 130, 140, 142, 144, 150, 190, and 192 in one embodiment. Not all message fields are used for each type of the message. For example, the field 150 for number of nodes and the field 192 for ring connectivity map are usually not used for RM_INIT, RM_SWITCH_A, and RM_SWITCH_M. The unused message fields can be set to zero.

According to one embodiment of the present invention, the ring map discovery process may be performed in either a manual mode or an automatic mode. In the manual mode, the ring map is provisioned manually without using the protocol message as shown in FIG. 1. In the automatic mode, the ring map is created and updated automatically using the protocol message. Usually, all nodes in the ring need to work in the same mode, either the manual mode or the automatic mode. If a mode mismatch is detected, an alarm message would be sent to the BLSR management system.

In response to a switch command or message, a node switches between the manual mode and the automatic mode. For example, upon receiving a RM_SWITCH_M message, a node may switch from the automatic mode to the manual mode, and stop communicating with other nodes with the protocol message as shown in FIG. 1. Upon receiving a RM_SWITCH_A message, a node may switch from the manual mode to the automatic mode. The node initializes the ring map and starts the automatic discovery process followed by the automatic validation process. The automatic discovery and validation processes may use a 12-byte message as shown in FIG. 1. The protocol message traverses between various nodes over, for example, the SONET DCC channel.

As discussed above, a node working in the automatic mode supports two processes. The node usually remains in the discovery stage until its ring map is created. After the creation of the ring map, the node usually enters the validation stage. This sequence is merely an example, which should not unduly limit the scope of the present invention. One of ordinary skill in the art would recognize many variations, alternatives, and modifications. For example, the node may exit the validation stage and reenter the discovery stage. The automatic discovery may be triggered by at least a switch from the manual mode, or a change in ring topology.

Figure 2:
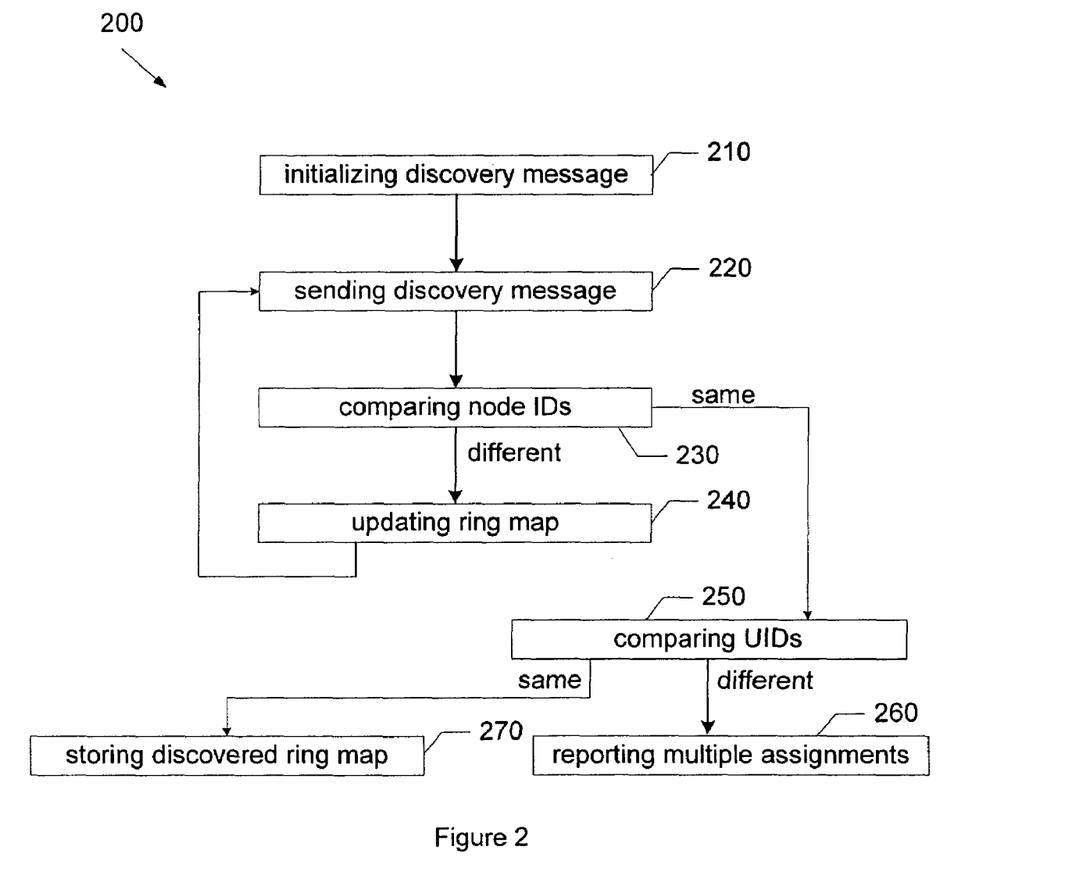
FIG. 2 is a simplified method for automatic ring map discovery according to an embodiment of the present invention.

FIG. 2 is a simplified method for automatic ring map discovery according to an embodiment of the present invention. This diagram is merely an example, which should not unduly limit the scope of the claims. One of ordinary skill in the art would recognize many variations, alternatives, and modifications. The method 200 includes a process 210 for initializing discovery message, a process 220 for sending discovery message, a process 230 for comparing Node IDs, a process 240 for update ring map, a process 250 for comparing UIDs, a process 260 for reporting multiple assignments, and a process 270 for storing discovered ring map. Although the above has been shown using a selected sequence of processes, there can be many alternatives, modifications, and variations. For example, some of the processes may be expanded and/or combined. Other processes may be inserted to those noted above. Depending upon the embodiment, the specific sequence of processes may be interchanged with others replaced. Further details of these processes are found throughout the present specification and more particularly below.

At the process 210, a discovery message as shown in FIG. 1 is initialized. The initialization is performed at a source node in BLSR. Upon initialization, the version field 110 stores a three-bit number, such as 000, representing the protocol version used. Additionally, the message type field 120 stores a three-bit number, 000, representing the message type RM_DISCOVER. Moreover, the UID fields 140 and 142 together store a 16-bit unique identification (UID) of the source node. Each of the two fields stores 8 bits. Also, the Node ID field 144 stores the Node ID assigned to the source node. Additionally, the field 150 for number of nodes is set to zero at all bits. Bits in the field 192 for ring connectivity map (RCM) and the reserved field 130 are also initialized to zero.

At the process 220, the discovery message is sent from a node in BLSR. For example, the node is the source node sending out the initialized discovery message as discussed above. Subsequently, the discovery message traverses to other nodes on the BLSR ring. In one embodiment, the discovery message travels in the clockwise direction.

At the process 230, the Node ID in the Node ID field of the discovery message is compared to the Node ID of the node receiving the discovery message. If the two Node IDs are different, the process 240 for update ring map is performed. If the two Node IDs are identical, the node would terminate the transmission of the discovery message, and the process 250 for comparing UIDs is performed.

At the process 240, the value stored in the field 150 for number of nodes is increased by one. For example, the number of nodes increases from M to M+1, where M is an integer equal to or larger than zero. The Node ID for the node receiving the message is stored in the subfield corresponding to $N_{M+1}$. As shown in FIG. 1, the subfields corresponds the Node IDs $N_1$ through $N_{15}$ respectively. Subsequently, the discovery message is sent to the next node, for example, in the same clockwise direction.

At the process 250, the UID in the UID fields 140 and 142 of the discovery message is compared to the UID of the node receiving the discovery message. If the two UIDs are different, the process 260 for reporting multiple assignments is performed. If the two UIDs are identical, the process 270 for storing discovered ring map is performed.

At the process 260, the node reports to the BLSR management system that the same Node ID have been assigned to at least two different nodes with different UIDs. The report may be sent in the form of an alarm message. At the process 270, the node stores the discovered ring map. The node has the same Node ID as the Node ID stored in the Node ID field 144, and the node also has the same UID as the UID stored in the UID fields 140 and 142. Hence the node is the source node that initiated the discovery message. The message has traveled through every node on the ring, and the ring map discovery process has been completed. The ring map includes the Node ID stored in the field 144 and the ring connectivity map recorded in the field 192. For example, the ring map stored at the source node is a list of Node IDs of $N_0, N_1, N_2, \ldots, N_n, \ldots,$ and $N_k$. $N_0$ is the same Node ID stored in the field 144 of the discovery message. $N_1, N_2, \ldots, N_n, \ldots,$ and $N_k$ are the same Node IDs stored in the subfields 160, 162, . . . , 160+2(n−1), . . . , and 160+2(k−1) of the discovery message respectively. n is a positive integer, and k is the number of nodes stored in the field 150. Additionally, the ring map may also include the number of node stored in the field 150. The number of nodes represents how many nodes other than the source node are present in the BLSR ring.

As discussed above and further emphasized here, FIG. 2 is merely an example, which should not unduly limit the scope of the claims. One of ordinary skill in the art would recognize many variations, alternatives, and modifications. For example, if the source node does not receive the discovery message within a predetermined period of time after the source node sends out the discovery message, the source node reports the discovery failure to the management system. As another example, if the receiving node has compiled a ring map, the receiving node checks whether the Node ID of the source node for the discovery message is present in the ring map of the receiving node. If the Node ID of the source node for the discovery message is not present, the receiving node sends out an initialization message and another discovery message that is different from the discovery message the receiving node received.

Figure 2A:
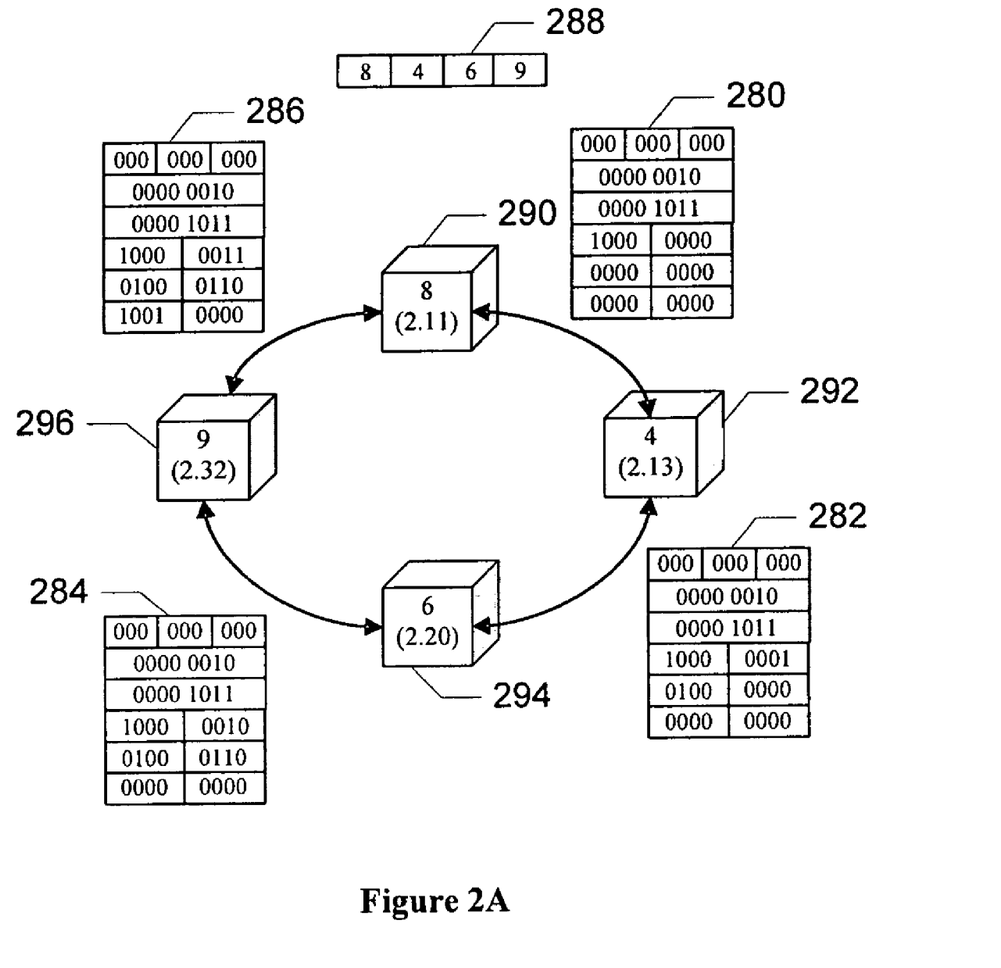
FIG. 2A is a simplified method for automatic ring map discovery according to another embodiment of the present invention.

FIG. 2A is a simplified method for automatic ring map discovery according to another embodiment of the present invention. This diagram is merely an example, which should not unduly limit the scope of the claims. One of ordinary skill in the art would recognize many variations, alternatives, and modifications. As shown in FIG. 2A, a ring includes four nodes 290, 292, 294, and 296. These nodes each have a Node ID and a unique identification expressed in the decimal system as shown in Table 2.

TABLE 2

| Node | Node ID | Unique Identification |
|------|---------|----------------------|
| 290  | 8       | 2.11                 |
| 292  | 4       | 2.13                 |
| 294  | 6       | 2.20                 |
| 296  | 9       | 2.32                 |

The node 290 initializes a discovery message into a message 280, substantially as discussed for the process 210. For the message 280, the version field 110 stores 000 representing the protocol version being used. Additionally, the message type field 120 stores a three-bit number, 000, representing the message type RM_DISCOVER. Moreover, the UID field 140 stores a eight-bit number 00000010, and the UID field 142 stores another eight-bit number 00001011. These two eight-bit numbers represents the unique identification of 2.11 for the source node 290. Also, the Node ID field 144 stores a four-bit number, 1000, representing the Node ID of 8 assigned to the source node 290. Additionally, the field 150 for number of nodes is set to zero at all bits. Bits in the field 192 for ring connectivity map and the reserved field 130 are also initialized to zero. The source node 290 sends the discovery message to other nodes in the ring, substantially as discussed for the process 220. For example, the discovery message travels in the clockwise direction.

The node 292 receives the discovery message and subsequently update the ring map as stored in the discovery message, substantially as discussed for the processes 230 and 240. The message 280 is modified into a message 282. The value stored in the field 150 for number of nodes becomes 0001. The value stored in the subfield 160 becomes 0100, representing the Node ID of 4 for the receiving node 292. Subsequently, the discovery message is sent to the next node 294.

The node 294 receives the discovery message and subsequently update the ring map as stored in the discovery message, substantially as discussed for the processes 230 and 240. The message 282 is modified into a message 284. The value stored in the field 150 for number of nodes becomes 0010. The value stored in the subfield 162 becomes 0110, representing the Node ID of 6 for the receiving node 294. Subsequently, the discovery message is sent to the next node 296.

The node 296 receives the discovery message and subsequently update the ring map as stored in the discovery message, substantially as discussed for the processes 230 and 240. The message 284 is modified into a message 286. The value stored in the field 150 for number of nodes becomes 0011. The value stored in the subfield 164 becomes 1001, representing the Node ID of 9 for the receiving node 296. Subsequently, the discovery message is sent to the next node 290.

The node 290 receives the discovery message that the source 290 initially sends out. The message 286 contains a complete order of nodes other than the node 290 itself. The node 290 terminates the discovery message and updates its ring map according to the connectivity map in the message, substantially as discussed for the processes 230, 250, and 270. The ring map 288 stored at the node 290 includes Node IDs 8, 4, 6, and 9.

Figure 3:
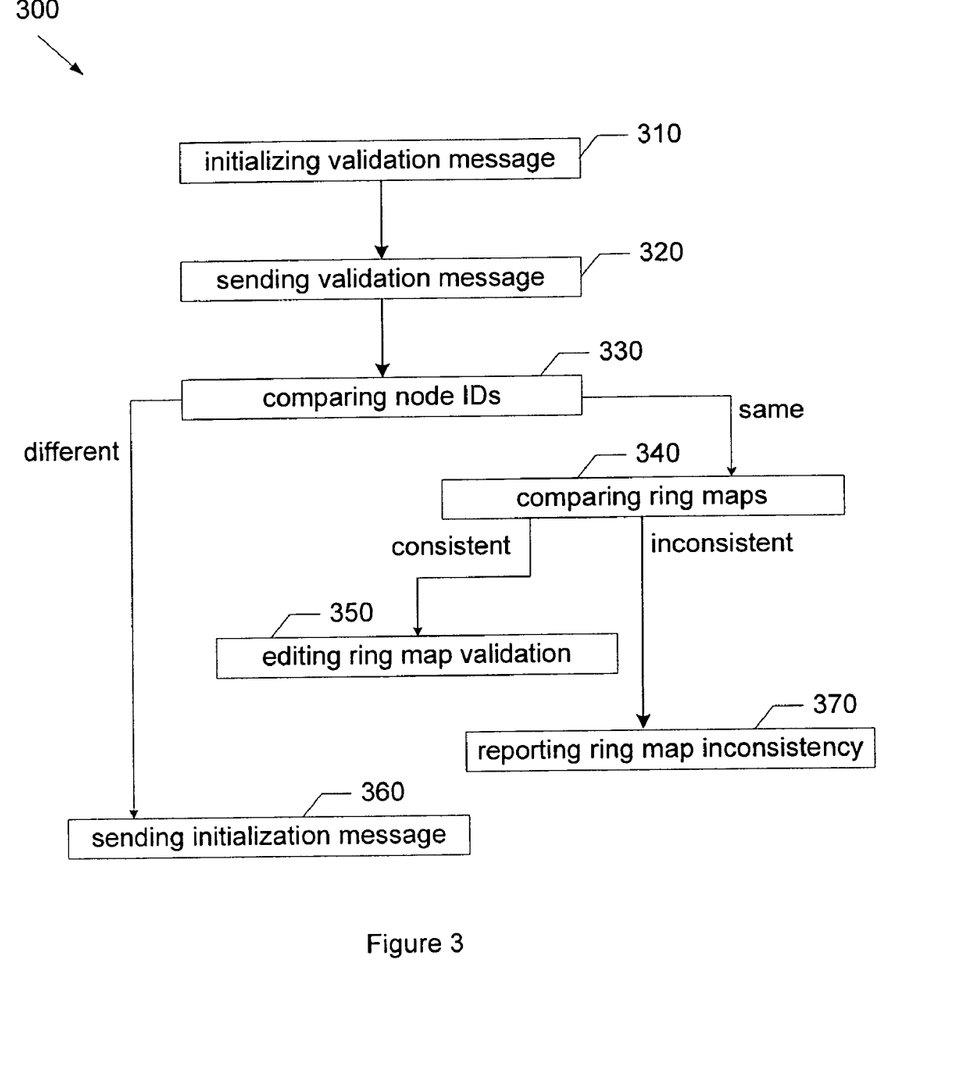
FIG. 3 is a simplified method for automatic ring map validation according to an embodiment of the present invention.

FIG. 3 is a simplified method for automatic ring map validation according to an embodiment of the present invention. This diagram is merely an example, which should not unduly limit the scope of the claims. One of ordinary skill in the art would recognize many variations, alternatives, and modifications. The method 300 includes a process 310 for initializing validation message, a process 320 for sending validation message, a process 330 for comparing Node IDs, a process 340 for comparing ring maps, a process 350 for ending ring map validation, a process 360 for sending initialization message, and a process 370 for reporting ring map inconsistency. Although the above has been shown using a selected sequence of processes, there can be many alternatives, modifications, and variations. For example, some of the processes may be expanded and/or combined. Other processes may be inserted to those noted above. Depending upon the embodiment, the specific sequence of processes may be interchanged with others replaced. Further details of these processes are found throughout the present specification and more particularly below.

At the process 310, a validation message as shown in FIG. 1 is initialized. The initialization is performed at a source node in BLSR. Upon initialization, the version field 110 stores a three-bit number, such as 000, representing the protocol version used. Additionally, the message type field 120 stores a three-bit number, 001, representing the message type RM_VALIDATE. Moreover, the UID fields 140 and 142 together store a 16-bit unique identification (UID) of the source node. Each of the two fields stores 8 bits. Also, the Node ID field 144 stores the Node ID assigned to the source node. Additionally, the field 150 for number of nodes and the field 192 for ring connectivity map are set according to the ring map stored at the source node. Bits of the reserved field 130 are initialized to zero.

At the process 320, the validation message is sent from the source node to the two nearest neighboring nodes. In one embodiment, the validation message travels to the nearest node in the clockwise direction and the nearest node in the counterclockwise direction.

At the process 330, the Node IDs are compared at the node receiving the validation message from the source node. If the receiving node has not yet compiled its ring map, this validation message is discarded. The Node ID stored in the field 144 is compared to the Node ID of the node from which the receiving node expects to receive the validation message. In one embodiment, the receiving node is the nearest node in the clockwise direction and the ring map at the source node was discovered also in the clockwise direction, the Node ID in the Node ID field 144 of the validation message is compared to the last Node ID stored in the field 192 for ring connectivity map. The last Node ID is stored in the subfield corresponding to $N_k$, where k is the number of nodes stored in the field 150. In another embodiment, the receiving node is the nearest node in the counterclockwise direction and the ring map at the source was discovered in the clockwise direction, the Node ID in the Node ID field 144 of the validation message is compared to the first Node ID stored in the field 192 for ring connectivity map. The first Node ID is stored in the subfield corresponding to $N_1$ as shown in FIG. 1. These embodiments are merely examples, which should not unduly limit the scope of the claims. One of ordinary skill in the art would recognize many variations, alternatives, and modifications.

If the two Node IDs under comparison are the same, the validation message was sent from the expected neighboring node. The ring topology has not changed since the ring map at the receiving node was compiled. The process 340 for comparing ring maps is subsequently performed. If the two Node IDs are different, the validation message was not sent from the expected neighboring node. The ring topology has probably changed since the ring map at the receiving node was compiled. For example, the expected neighboring node has been removed from the ring, or an additional node has been inserted into the ring between the expected neighboring node and the receiving node. The process 360 for sending initialization message is subsequently performed.

At the process 340, the ring map stored in the validation message is compared with the ring map stored at the receiving node. The comparison takes into account the different locations of the source node and the receiving node in the ring. In one embodiment, the receiving node is the nearest node in the clockwise direction and the ring map at the source node was discovered also in the clockwise direction. The Node ID of the receiving node, i.e., $N_0$ of the ring map of the receiving node, is compared with the Node ID $N_1$ in the ring connectivity map of the validation message. The Node IDs of $N_2, N_3, \ldots, N_1, \ldots,$ and $N_k$ in the validation message are compared to the Node IDs of $N_1, N_2, \ldots, N_{n-1}, \ldots,$ and $N_{k-1}$ of the ring map of the receiving node respectively. The Node IDs $N_1, N_2, \ldots, N_n, \ldots,$ and $N_k$ in the validation message are stored in the subfields 160, 162, ..., 160+2(n−1), ..., and 160+2(k−1). n is a positive integer, and k is the number of nodes stored in the field 150. If each comparison as discussed above shows the two Node IDs are identical, the ring maps stored in the validation message and at the receiving node are consistent. Subsequently, the process 350 for ending ring map validation is performed. If any comparison as discussed above shows the two Node IDs are not identical, the ring maps stored in the validation message and at the receiving node are not consistent. Subsequently, the process 370 for reporting ring map inconsistency is performed.

In another embodiment, the receiving node is the nearest node in the counterclockwise direction and the ring map at the source node was discovered in the clockwise direction. The Node ID of the receiving node, i.e., $N_0$ of the ring map of the receiving node, is compared with the Node ID $N_k$ in the ring connectivity map of the validation message. The Node IDs of $N_1, N_2, \ldots, N_n, \ldots,$ and $N_{k-1}$ in the validation message are compared to Node IDs of $N_2, N_3, \ldots, N_{n+1}, \ldots,$ and $N_k$ of the ring map of the receiving node respectively. The Node IDs $N_1, N_2, \ldots, N_n, \ldots,$ and $N_k$ in the validation message are stored in the subfields 160, 162, ..., 160+2(n−1), ..., and 160+2(k−1). n is a positive integer, and k is the number of nodes stored in the field 150. If each comparison as discussed above shows the two Node IDs are identical, the ring maps stored in the validation message and at the receiving node are consistent. Subsequently, the process 350 for ending ring map validation is performed. If any comparison as discussed above shows the two Node IDs are not identical, the ring maps stored in the validation message and at the receiving node are not consistent. Subsequently, the process 360 for sending initialization message is performed.

At the process 350 for ending ring map validation, the ring map validation process is completed. Another ring map validation process may be started immediately or after a predetermined period of time. At the process 360, the receiving node sends an initialization message to the ring to notify all other nodes to restart the discovery procedure. In the initialization message as shown in FIG. 1, the version field 110 stores a three-bit number, such as 000, representing the protocol version used. Additionally, the message type field 120 stores a three-bit number, 010, representing the message type RM_INIT. Moreover, the UID fields 140 and 142 together store a 16-bit unique identification (UID) of the source node of the initialization message. The source node is the receiving node of the validation message. Also, the Node ID field 144 stores the Node ID assigned to the source node of the initialization message. Additionally, bits of the reserved field 130, the field 150 for number of nodes, and the field 192 for ring connectivity map are set to zero. Moreover, the process 360 may also include sending a discovery message.

At the process 370, the receiving node reports the inconsistency between the ring maps stored in the validation message and the receiving node to the management system. The report may take the form of an alarm message. Additionally, the process 370 may also include sending an initialization message to the ring to notify all other nodes to restart the discovery procedure.

As discussed above and further emphasized here, FIG. 3 is merely an example, which should not unduly limit the scope of the claims. One of ordinary skill in the art would recognize many variations, alternatives, and modifications. For example, the source node for a validation message may also receive a discover message from another node. Upon receipt, the source node for the validation message checks whether the Node ID of the source node for the discovery message is present in the ring map of the source node for the validation message. If the Node ID is not present in the ring map, a new node probably has been added to the ring. The source node for the validation message starts a new discovery process by sending out a discovery message as shown in FIG. 2 and also sends out an initialization message to notify all other nodes to start the discovery process. If the Node ID is present in the ring map, the source node for the validation message adds its own Node ID to the connectivity map in the discovery message and relay the discovery message to the next node in the ring.

Figure 3A:
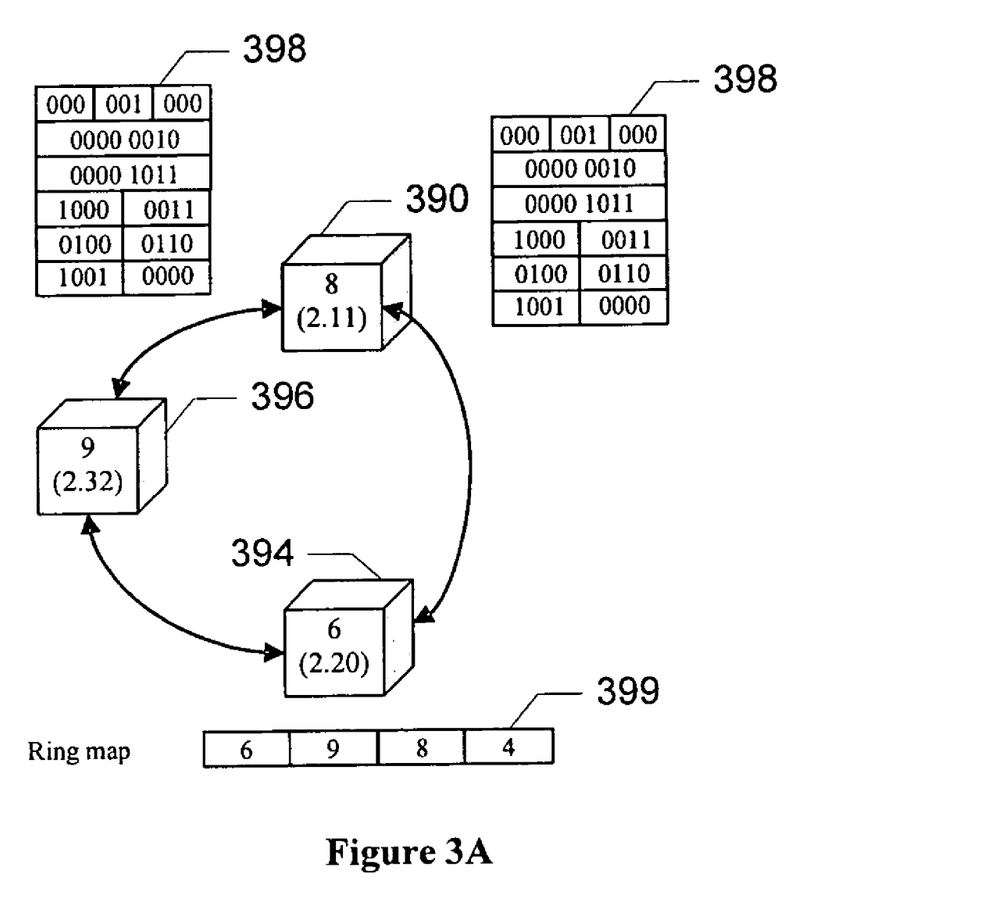
FIG. 3A is a simplified method for automatic ring map validation according to another embodiment of the present invention.

FIG. 3A is a simplified method for automatic ring map validation according to another embodiment of the present invention. This diagram is merely an example, which should not unduly limit the scope of the claims. One of ordinary skill in the art would recognize many variations, alternatives, and modifications. As shown in FIG. 3A, a ring includes three nodes 390, 394, and 396. These nodes each have a Node ID and a unique identification expressed in the decimal system as shown in Table 3.

TABLE 3

| Node | Node ID | Unique Identification |
|---|---|---|
| 390 | 8 | 2.11 |
| 394 | 6 | 2.20 |
| 396 | 9 | 2.32 |

The node 390 initializes a validation message into a message 398, substantially as discussed for the process 310. Upon initialization, the version field 110 stores a three-bit number, such as 000, representing the protocol version being used. Additionally, the message type field 120 stores a three-bit number, 001, representing the message type RM_VALIDATE. Moreover, the UID field 140 stores a eight-bit number 00000010, and the UID field 142 stores another eight-bit number 00001011. These two eight-bit numbers represents the unique identification of 2.11 for the source node 390. Also, the Node ID field 144 stores a four-bit number, 1000, representing the Node ID of 8 assigned to the source node 390. The value stored in the field 150 for number of nodes is 0011 representing 3 nodes other than the source node 390 in the ring. The value stored in the subfields 160, 162, and 164 are 0100, 0110 and 1001, representing the Node IDs of 4, 6 and 9 for the other nodes in the ring. Subsequently, the validation message is sent to the two neighboring nodes 394 and 396.

The node 396 receives the validation message and confirm the consistency between the ring map stored in the validation message and the ring map stored at the node 396, substantially as discussed for the processes 330, 340, and 350.

The node 394 receives the validation message and sends out an initialization message to other nodes, substantially as discussed for the processes 330 and 360. The node 394 has compiled a ring map 399 and thus expects to receive a validation message from a node with a Node ID of 4 or 9. When the node 394 receives the validation message from the node with a Node ID of 8, the node 394 determines the node with a Node ID of 4 has been removed from the ring. In response, the node 394 sends out an initialization message to the ring to inform other nodes to restart the discovery process.

Figure 4:
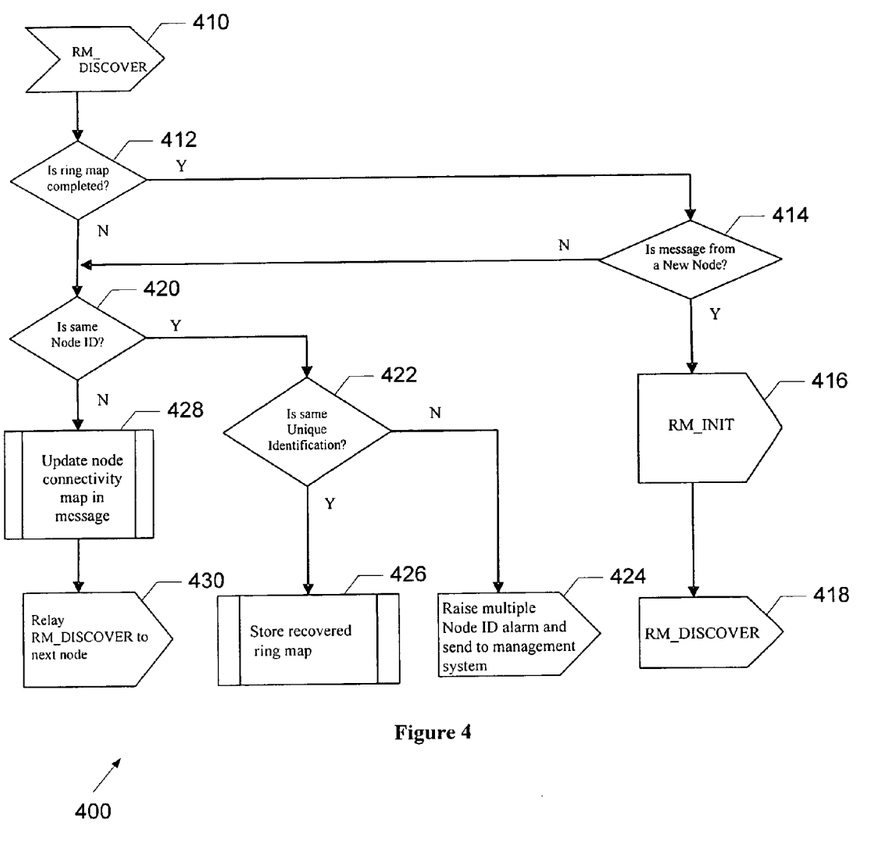
FIG. 4 is a simplified method for processing a discovery message according to an embodiment of the present invention.

FIG. 4 is a simplified method for processing a discovery message according to an embodiment of the present invention. This diagram is merely an example, which should not unduly limit the scope of the claims. One of ordinary skill in the art would recognize many variations, alternatives, and modifications. The method 400 includes a process 410 for initializing and sending discovery message, a process 412 for checking ring map status, a process 414 for checking status of source node, a process 416 for sending initialization message, a process 418 for sending another discovery message, a process 420 for comparing Node IDs, a process 422 for comparing UIDs, a process 424 for reporting multiple assignments, a process 426 for storing discovered ring map, a process 428 for update ring map, a process 428 for sending discovery message to next node. Although the above has been shown using a selected sequence of processes, there can be many alternatives, modifications, and variations. For example, the processes 416 and 418 may be combined. Other processes may be expanded or inserted to those noted above. Depending upon the embodiment, the specific sequence of processes may be interchanged with others replaced. Further details of these processes are found throughout the present specification and more particularly below.

At the process 410, a discovery message is initialized and sent from a source node, substantially as discussed for the processes 210 and 220. At the process 412, a receiving node checks whether a ring map has already been stored at the receiving node. If there exists a ring map at the receiving node, the process 414 is performed. If there does not exist a ring map at the receiving node, the process 420 is performed.

At the process 414, the receiving node checks whether the Node ID of the source node for the discovery message is present in the ring map of the receiving node. If the Node ID of the source node for the discovery message is present, the process 420 is performed. If the Node ID of the source node for the discovery message is not present, the process 416 is performed. At the process 416, the discover message is terminated. The receiving node sends out an initialization message, substantially as discussed for the process 360. At the process 418, the receiving node sends out another discovery message different from the discovery message the receiving node received.

At the process 420, the receiving node compares the Node IDs, substantially as discussed for the process 230. If the Node IDs are identical, the process 422 is performed. If the Node IDs are not identical, the process 428 is performed. At the process 422, the receiving node compares the UIDs, substantially as discussed for the process 250. If the UIDs are identical, the process 426 is performed. If the UIDs are not identical, the process 424 is performed. At the process 424, the receiving node reports multiple assignments of the same Node ID to the management system, substantially as discussed for the process 260. At the process 426, the source node stores the discovered ring map, substantially as discussed for the process 270.

At the process 428, the ring map stored in the discovery message is updated at the receiving node, substantially as discussed for the process 240. At process 428, the receiving node relays the discovery message to the next node in the ring.

As shown in FIG. 4, the discovery message may travel through all nodes on the entire ring. Each node other than the source node adds its Node ID to the connectivity map in the message. When the message returns to the source node, the message contains a complete order of nodes which represents connectivity of the ring.

Figure 5:
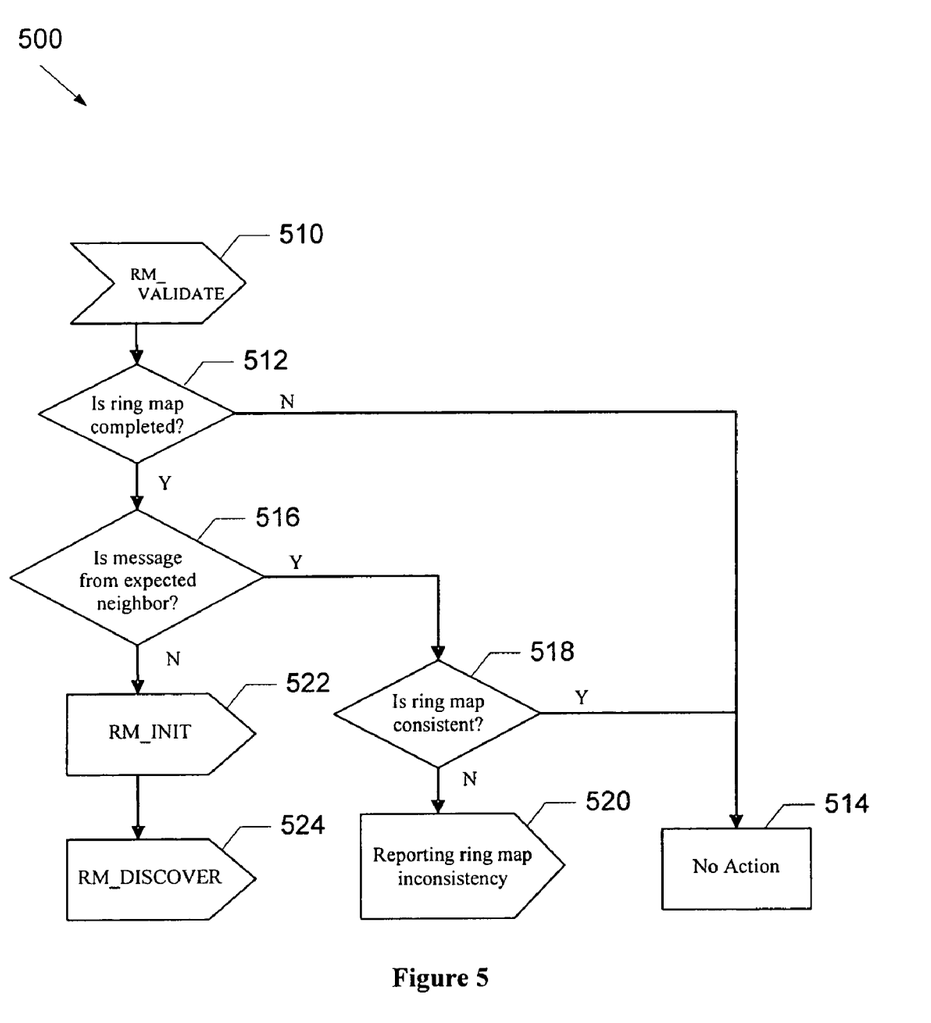
FIG. 5 is a simplified method for processing a validation message according to an embodiment of the present invention.

FIG. 5 is a simplified method for processing a validation message according to an embodiment of the present invention. This diagram is merely an example, which should not unduly limit the scope of the claims. One of ordinary skill in the art would recognize many variations, alternatives, and modifications. The method 500 includes a process 510 for sending validation message, a process 512 for checking ring map status, a process 514 for no action, a process 516 for comparing Node IDs, a process 518 for comparing ring maps, a process 520 for reporting ring map inconsistency, a process 522 for sending initialization message, and a process 524 for sending discovery message. Although the above has been shown using a selected sequence of processes, there can be many alternatives, modifications, and variations. For example, the processes 522 and 524 may be combined. Other processes may be expanded or inserted to those noted above. Depending upon the embodiment, the specific sequence of processes may be interchanged with others replaced. Further details of these processes are found throughout the present specification and more particularly below.

At the process 510, a validation message is sent from a source node, substantially as discussed for the processes 310 and 320. At the process 520, the receiving node checks whether a ring map has been compiled for the receiving node. If the ring map exists, the process 514 is performed. If the ring map does not exist, the process 516 is performed.

At the process 514, no action is taken. The receiving node simply disregards the received validation message. At the process 516, the Node IDs are compared, substantially as discussed for the process 330. If the Node IDs are identical, the process 518 is performed. If the Node IDs are not identical, the process 522 is performed.

At the process 518, the ring maps are compared for consistency, substantially as discussed for the process 340. If the ring maps are consistent, the process 514 is performed. If the ring maps are not consistent, the process 520 is performed. At the process 520, the receiving node reports the inconsistency of the ring maps to the management system, substantially as discussed for the process 370. At the process 522, the receiving node sends out an initialization message, substantially as discussed for the process 360. At the process 524, the receiving node sends out a discovery message in order to compile a new ring map.

As shown in FIGS. 4 and 5, the automatic discovery process described in FIG. 2 and the automatic validation process described in FIG. 3 interact with each other. The interaction may occur through an initialization message. For example, an initialization message is sent when a node detects a ring map inconsistence or a topology change. Upon receipt of the initialization message, another node initializes its ring map and a discovery message, and sends the discovery message to the ring.

Figure 6:
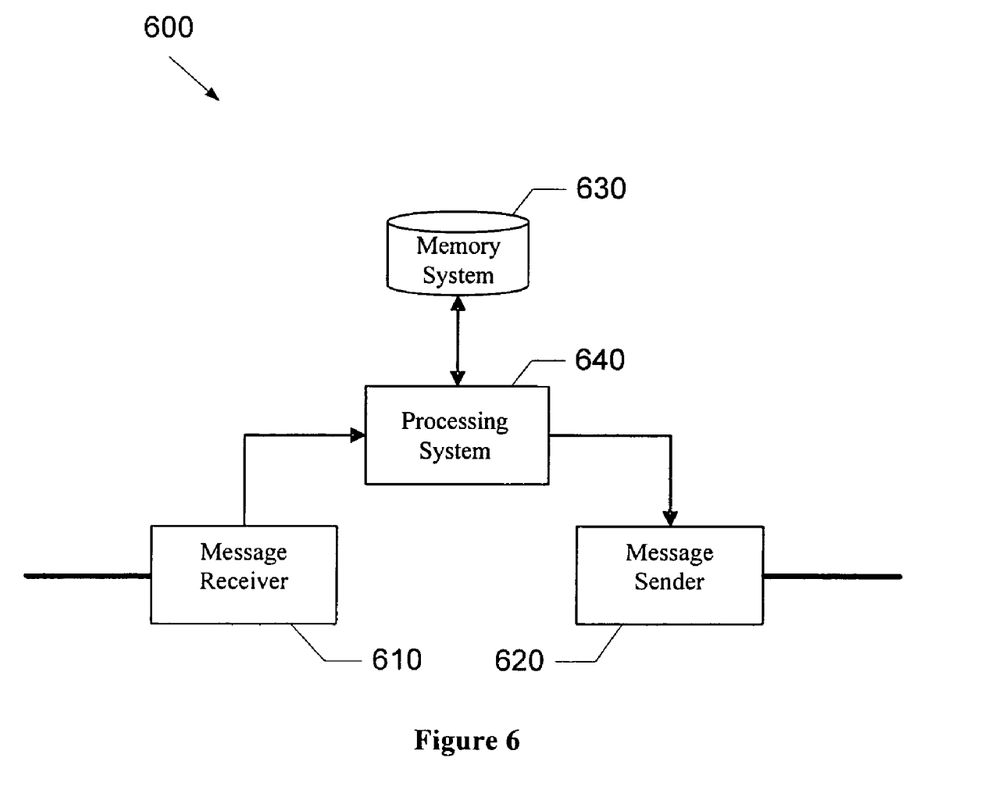
FIG. 6 is a simplified apparatus for automatic ring map discovery and validation according to an embodiment of the present invention.

FIG. 6 is a simplified apparatus for automatic ring map discovery and validation according to an embodiment of the present invention. This diagram is merely an example, which should not unduly limit the scope of the claims. One of ordinary skill in the art would recognize many variations, alternatives, and modifications. The apparatus 600 includes a message receiver 610, a message sender 620, a memory system 630, and a processing system 640. Although the above has been shown using the systems 610, 620, 630, and 640, there can be many alternatives, modifications, and variations. For example, the memory system 630 and the processing system 640 may be combined. The processing system 640 may be expanded to include its own memory system. Other systems may be added to those noted above. Depending upon the embodiment, the specific arrangement of systems may be interchanged with others replaced. Further details of these systems found throughout the present specification and more particularly below.

The message receiver 610 is configured to receive a first discovery message. The first discovery message includes at least a first node identification associated with a first node, a first unique identification associated with the first node, and a first ring connectivity map. The message sender 620 is configured to send an alarm message and send a second discovery message. The second discovery message includes at least a second node identification associated with a second node, a second unique identification associated with the second node, and a second ring connectivity map. The memory system 630 is configured to store at least information associated with a ring map. The processing system 640 is coupled to the message receiver 610, the message sender 620, and the memory system 630. Additionally, the processing system 640 is associated with a third node. The third node is associated with a third node identification and a third unique identification. Moreover, the processing system 640 is configured to process at least information associated with the first node identification and the third node identification. If the first node identification and the third node identification are different, the processing system 640 updates the first ring connectivity map. If the first node identification and the third node identification are identical, the processing system 640 processes at least information associated with the third unique identification and the third unique identification, and instruct the message sender 620 to send the alarm message indicating multiple assignments of the first node identification if the first unique identification and the third unique identification are different. The processing system 640 is further configured to store the ring map in the memory system if the first node identification and the third node identification are identical and if the first predetermined identification and the third predetermined identification are also identical. The ring map including information associated with the first ring connectivity map and the first node identification. For example, the second ring connectivity map is the updated first ring connectivity map, the second node identification is the same as the first node identification, and the second unique identification is the same as the first unique identification.

Additionally, the message receiver 610 is also configured to receive a first validation message. The first validation message includes at least a fourth node identification associated with a fourth node and a fourth ring connectivity map associated with the fourth node. The first validation message is also associated with a fourth ring map including at least information associated with the fourth node identification and the fourth ring connectivity map. The message sender 620 is also configured to send an initialization message and send a second validation message. The second validation message includes at least the third node identification associated with the third node and the third ring connectivity map associated with the third node. The validation message is associated with the ring map including at least information associated with the third node identification and the third ring connectivity map. The processing system 640 is also configured to process at least information associated with the fourth node identification and the ring map. If the fourth node identification is not associated with a predetermined node, the processing system 640 sends the initialization message. If the fourth node identification is associated with the predetermined node, the processing system 640 processes at least information associated with the fourth ring map and the ring map. If the fourth ring map and the ring map are inconsistent, the processing system 640 instructs the message sender 620 to send the alarm message. For example, the predetermined node is one of the two nodes nearest to the third node associated with the third node identification and the third unique identification.

As discussed above and further emphasized here, one of ordinary skill in the art would recognize many variations, alternatives, and modifications. For example, each node of a BLSR has an apparatus substantially similar to the apparatus 600. The message receiver 610 is configured to receive some or all messages related to FIGS. 1, 2, 2A, 3, 3A, 4, and 5. The message sender 620 is configured to send some or all messages related to FIGS. 1, 2, 2A, 3, 3A, 4, and 5. The processing system 640 is configured to perform some or all processes related to FIGS. 1, 2, 2A, 3, 3A, 4, and 5. These processes may be performed with software, hardware, or combination thereof.

The present invention has various advantages. Certain embodiments of the present invention reduce the number of the types of messages used for ring map discovery and validation. These different types of messages use a uniform format to simply message processing and facilitate implementation. Some embodiments of the present invention enable SONET equipments to automatically discover ring connectivity in BLSR. The discovery process can effectively detect whether a single Node ID has been assigned to multiple nodes. Certain embodiments of the present invention provide reliable ring maps by validating the consistency of ring maps at various nodes. Some embodiments of the present invention support both the manual provision and the automatic discovery of ring map. Certain embodiments of the present invention provide a mechanism for nodes to automatically detect ring topology change and update their ring maps. The ring topology change may include removal of a node or addition of a node.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for generating a ring map for optical network applications, the method comprising:
sending a first discovery message to a first node through a portion of an optical network, the first node corresponding to a first node identification and a first predetermined identification, the first discovery message including at least a source node identification associated with a source node, a source predetermined identification associated with the source node, and a first ring connectivity map;
processing at least information associated with the source node identification and the first node identification;
if the source node identification and the first node identification are different, updating the first ring connectivity map;
if the source node identification and the first node identification are identical,
processing at least information associated with the source predetermined identification and the first predetermined identification;
if the source predetermined identification and the first predetermined identification are different, sending a first alarm message indicating multiple assignments of the source node identification.

2. The method of claim 1, and further comprising:
if the source node identification and the first node identification are identical and if the source predetermined identification and the first predetermined identification are identical, storing a first ring map including at least information associated with the first ring connectivity map at the source node.

3. The method of claim 2, and further comprising:
sending a validation message to a second node for validating the first ring map, the validation message including at least information associated with the first ring map.

4. The method of claim 1, and further comprising:
if the first node includes a second ring map,
processing at least information associated with the second ring map and the source node identification;
if the source node identification is not present in the second ring map, sending a first initialization message.

5. The method of claim 4, and further comprising:
if the first node includes the second ring map and if the source node identification is absent from the second ring map, sending a second discovery message.

6. The method of claim 1 wherein the first node is the same as the source node.

7. The method of claim 1 wherein the first node is different from the source node.

8. The method of claim 1 wherein updating the first ring connectivity map comprises adding the first node identification to the first ring connectivity map.

9. The method of claim 1, and further comprising:
if the source node identification and the first node identification are different, increasing a number of nodes by one, the number of nodes stored in the first discovery message.

10. The method of claim 1 wherein the first predetermined identification is a first unique identification, and the source predetermined identification is a source unique identification.

11. A method for validating a ring map for optical network applications, the method comprising:
sending a first validation message from a source node through at least a portion of an optical network, the source node associated with a first ring map, the first validation message including at least a source node identification associated with the source node and a first ring connectivity map associated with the source node, the first ring map including at least information associated with the source node identification and the first ring connectivity map;
receiving the first validation message at a first node directly from the source node, the first node associated with a second ring map;
processing at least information associated with the source node identification and the second ring map;
if the source node identification is not associated with a predetermined node, sending a first initialization message;
if the source node identification is associated with the predetermined node,
processing at least information associated with the first ring map and the second ring map;
if the first ring map and the second ring map are inconsistent, sending a first alarm message.

12. The method of claim 11 wherein processing at least information associated with the first ring map and the second ring map comprises:
   determining whether the mth node identification in the first ring map is the same as the (m−1)th node identification or the (m+1)th node identification in the second ring map, m being an integer.

13. The method of claim 12 wherein processing at least information associated with the first ring map and the second ring map further comprises:
   if the source node identification is the second node identification in the second ring map, determining whether the mth node identification in the first ring map is the same as the (m+1)th node identification in the second ring map;
   if the source node identification is the last node identification in the second ring map, determining whether the mth node identification in the first ring map is the same as the (m−1)th node identification in the second ring map.

14. The method of claim 11, and further comprising:
   receiving a first discovery message at the source node, the first discovery message including at least a second node identification associated with a second node;
   processing at least information associated with the second node identification and the first ring map;
   if the second node identification is absent from the first ring map,
      sending a second discovery message for generating a third ring map at the source node;
      sending a second initialization message.

15. The method of claim 11 wherein the first node is the nearest node to the source node in a ring in a clockwise direction.

16. The method of claim 11 wherein the first node is the nearest node to the source node in a ring in a counterclockwise direction.

17. The method of claim 11, and further comprising if the source node identification is a node identification other than the second node identification or the last node identification in the second ring map, sending a first discovery message for generating a third ring map at the first node.

18. A method for processing a discovery message for optical network applications, the method comprising:
   sending a first discovery message to a first node through a portion of an optical network, the first node associated with a first node identification and a first predetermined identification, the first discovery message including at least a source node identification associated with a source node, a source predetermined identification associated with the source node, and a first ring connectivity map;
   if the first node includes a second ring map,
      processing at least information associated with the second ring map and the source node identification;
      if the source node identification is absent from the second ring map, sending a first initialization message;
   if the first node is free from the second ring map,
      processing at least information associated with the source node identification and the first node identification;
      if the source node identification and the first node identification are different, updating the first ring connectivity map and sending the first discovery message to a second node;
      if the source node identification and the first node identification are identical,
         processing at least information associated with the source predetermined identification and the first predetermined identification;
         if the source predetermined identification and the first predetermined identification are different, sending a first alarm message indicating multiple assignments of the source node identification.

19. The method of claim 18, and further comprising:
   if the source node identification and the first node identification are identical and if the source predetermined identification and the first predetermined identification are identical, storing at least information associated with the first ring connectivity map at the source node.

20. The method of claim 18 wherein updating the first ring connectivity map comprises adding the first node identification to the first ring connectivity map.

21. The method of claim 18 wherein the first predetermined identification is a first unique identification, and the source predetermined identification is a source unique identification.

22. A method for processing a validation message for optical network applications, the method comprising:
   sending a first validation message from a source node through at least a portion of an optical network, the source node associated with a first ring map, the first validation message including at least a source node identification associated with the source node and a first ring connectivity map associated with the source node, the first ring map including at least information associated with the source node identification and the first ring connectivity map;
   receiving the first validation message at a first node directly from the source node;
   if the first node includes a second ring map;
      processing at least information associated with the source node identification and the second ring map;
      if the source node identification is not associated with a predetermined node, sending a first initialization message;
      if the source node identification is associated with the predetermined node,
         processing at least information associated with the first ring map and the second ring map;
         if the first ring map and the second ring map are inconsistent, sending a first alarm message.

23. The method of claim 22, and further comprising if the first node includes the second ring map and if the source node identification is not associated with the predetermined node, sending a first discovery message.

24. An apparatus for generating a ring map for optical network applications, the apparatus comprising:
   a message receiver configured to receive a first discovery message, the first discovery message including at least a first node identification associated with a first node, a first predetermined identification associated with the first node, and a first ring connectivity map;
   a message sender configured to send an alarm message and send a second discovery message, the second discovery message including at least a second node identification associated with a second node, a second predetermined identification associated with the second node, and a second ring connectivity map;
   a memory system configured to store at least information associated with a ring map;

a processing system coupled to the message receiver, the message sender, and the memory system and associated with a third node identification and a third predetermined identification;

wherein the processing system is configured to
process at least information associated with the first node identification and the third node identification;
if the first node identification and the third node identification are different, update the first ring connectivity map;
if the first node identification and the third node identification are identical,
processing at least information associated with the first predetermined identification and the third predetermined identification;
if the first predetermined identification and the third predetermined identification are different, instruct the message sender to send the alarm message indicating multiple assignments of the first node identification.

25. The system of claim 24 wherein the second ring connectivity map is the updated first ring connectivity map.

26. The system of claim 25 wherein the second node identification is the same as the first node identification, and the second predetermined identification is the same as the first predetermined identification.

27. The apparatus of claim 24 wherein the processing system is further configured to store the ring map in the memory system if the first node identification and the third node identification are identical and if the first predetermined identification and the third predetermined identification are identical, the ring map including information associated with the first ring connectivity map and the first node identification.

28. An apparatus for validating a ring map for optical network applications, the apparatus comprising:
a message receiver configured to receive a first validation message, the first validation message including at least a first node identification associated with a first node and a first ring connectivity map associated with the first node, the first validation message associated with a first ring map including at least information associated with the first node identification and the first ring connectivity map;
a message sender configured to
send an initialization message;
send an alarm message;
send a second validation message, the second validation message including at least a second node identification associated with a second node and a second ring connectivity map associated with the second node, the second validation message associated with a second ring map including at least information associated with the second node identification and the second ring connectivity map;
a memory system configured to store at least information associated with the second ring map;
a processing system coupled to the message receiver, the message sender, and the memory system and associated with the second node identification and the second predetermined identification;
wherein the processing system is configured to
process at least information associated with the first node identification and the second ring map;
if the first node identification is not associated with a predetermined node, send the initialization message;
if the first node identification is associated with the predetermined node,
process at least information associated with the first ring map and the second ring map;
if the first ring map and the second ring map are inconsistent, instruct the message sender to send the alarm message.

29. The apparatus of claim 28 wherein the predetermined node is one of the two nodes nearest to a second node associated with the second node identification and the second predetermined identification.

* * * * *